H. A. WOODWARD.
CONSTANT LEVEL APPARATUS.
APPLICATION FILED MAR. 9, 1911.

1,010,562.

Patented Dec. 5, 1911.

WITNESSES

INVENTOR

UNITED STATES PATENT OFFICE.

HORACE A. WOODWARD, OF WEST ORANGE, NEW JERSEY.

CONSTANT-LEVEL APPARATUS.

1,010,562. Specification of Letters Patent. Patented Dec. 5, 1911.

Application filed March 9, 1911. Serial No. 613,384.

*To all whom it may concern:*

Be it known that I, HORACE A. WOODWARD, a citizen of the United States, residing at West Orange, State of New Jersey, my post-office address being 319 West Fifteenth street, New York, N. Y., have invented certain new and useful Improvements in Constant-Level Apparatus, of which the following is a specification.

The invention relates to apparatus for maintaining a constant level in a body of fluid, and is particularly applicable in filtering operations wherein it is desirable to control the supply of liquid to a filter from which liquid is being withdrawn at a more or less variable rate, and the invention is illustrated as applied to such filtering apparatus, but it will be understood that the invention is not limited to such specific use.

The primary objects of the invention are: the provision of a constant level apparatus of exceedingly simple and cheap construction; the provision of an apparatus of the character specified which is reliable in operation and has no expensive valves or similar mechanism liable to get out of order and require replacement; and the provision of an apparatus in which any of the parts can be readily replaced and which can be readily adjusted and regulated to meet any conditions of service.

Certain embodiments of the invention are illustrated in the accompanying drawings, wherein:—

Figure 1:
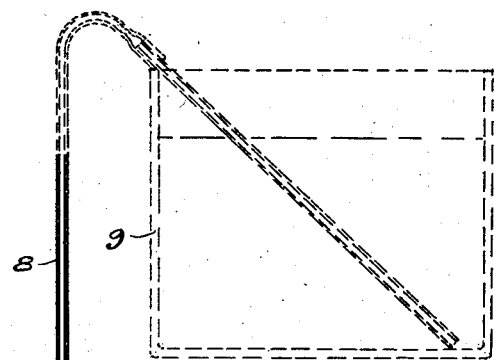
Figure 2:
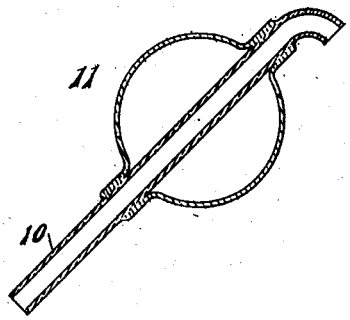
Figure 3:
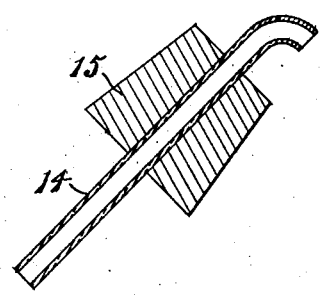
Figure 4:
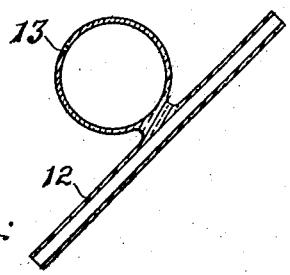

Figure 1 is a longitudinal section through a filter funnel with the invention applied thereto, the supply tank being indicated in dotted lines; and Figs. 2, 3 and 4 are sections through modified forms of floats which may be employed.

Referring to Fig. 1 of the drawing, the principal parts of the particular apparatus as there illustrated may be enumerated as follows. 1 is a filtering funnel which may be of any approved form; 2 is a support resting upon the top of the funnel, which support may be of any desired material, but is preferably of wood; 3 is a member preferably of cork or rubber fitting a perforation in the member 2 and readily removable therefrom, 4 is a tube, preferably of glass extending through the cork 3 and yieldingly held thereby at any desired position of adjustment; 5 is a flexible tube such as rubber, secured to the lower end of the tube 4 and recurved when in use, as indicated, in order to provide a throttling means for the liquid passing therethrough; 6 is an outlet tube of glass or other suitable material detachably secured to the outlet end of the flexible tube 5 as shown; 7 is a bulb which is mounted upon the tube 6 and constitutes a float for governing the throttling of the liquid passing through the tube 5; and 8 is an inlet tube of flexible material secured to the upper end of the supply pipe 4 and adapted to siphon a supply of liquid from the tank 9.

The operation and principle of the apparatus will be apparent from the foregoing description. If the level of the liquid in the funnel should tend to rise above the level for which the apparatus is set, the float 7 rises, thus kinking or bending the flexible tube to a greater extent and thereby reducing the flow of liquid therethrough. If on the other hand the level of the liquid tends to fall below the predetermined point for which the apparatus is set the float 7 moves down, thus reducing the amount of bend in the tube 5, which permits of a freer inflow of liquid through the flexible tube 5. It will be seen that the apparatus may be very readily adjusted by trial to keep the liquid in the funnel at any desired height, as the tube 4 may be slid up and down through the cork 3 until a point is determined at which the inflow to the funnel exactly counterbalances the outflow.

The float as illustrated in Fig. 1 is indicated as made of rubber, which rubber may be either hard or soft, but if desired, other materials may be substituted, such for instance as glass, and in many instances glass is to be preferred. In Fig. 2 the glass outlet tube 10 is shown as provided with a glass float 11, the float being tightly sealed to the tube in any desired manner. In Fig. 4 still another form of glass float is shown, the tube 12 carrying upon its side a glass float 13. As shown in Fig. 3 the glass outlet tube 14 is provided with a float in the form of the cork 15. Various other forms of float might obviously be substituted for the form shown.

I have shown one embodiment of the apparatus in Fig. 1, but it will be clear that many other arrangements might be substituted without departing from the invention as claimed. The particular means shown for supplying liquid to the tube 4, and comprising the tube 8 and the tank 9, constitute no part of the invention and any other desired means might be substituted. I have also shown the tubes 4 and 6 as of glass, and connected by means of the flexible tube 5, but it will be understood that my invention is not limited to this particular arrangement or to the particular material specified, the only requirement being that the inlet tube consisting of the parts 4, 5 and 6 shall have a flexible recurved portion adapted to throttle the flow of liquid therethrough. The use of the member 3 for adjustably holding the tube 4 is also not an essential element of my invention, nor in so far as this detail of construction is concerned is it necessary that the holding means consist of cork or rubber in order to support the tube yieldingly and adjustably.

Having thus described my invention and illustrated its use, what I claim as new and desire to secure by Letters Patent is the following:—

1. In apparatus for maintaining a constant level in a body of liquid, a relatively stiff supply tube for extending down into the liquid, a flexible outlet tube secured thereto at one end, and a float secured to the other end of the flexible tube.

2. In apparatus for maintaining a constant level in a body of liquid, a supply tube for extending down into the liquid and provided with a flexible outlet portion adapted to recurve and throttle the supply of fluid, and a float carried by the outlet end of the said portion.

3. In apparatus for maintaining a constant level in a body of liquid, a supply tube for extending down into the liquid, a flexible tube secured thereto at one end, and an outlet tube provided with a float secured to the other end of the flexible tube.

4. In combination in apparatus for maintaining a constant level, a receptacle, and means for maintaining a constant level in the receptacle comprising a supply tube extending down into the liquid and provided with a recurved flexible portion for throttling the supply of fluid passing therethrough, and a float carried by the outlet end of the said portion and adapted to govern the throttling of the liquid in the flexible portion.

5. In combination in apparatus for maintaining a constant level, a receptacle, a supporting means, and means for maintaining a constant level in the receptacle comprising a vertical tube mounted for slidable adjustment on the said support having a flexible outlet portion, and a float carried by the outlet end of the flexible tube, and adapted to recurve such tube when liquid is supplied in the receptacle to a predetermined height.

6. In combination in apparatus for maintaining a constant level, a receptacle, a support mounted above the receptacle, a tube extending through the support, a member yieldingly engaging the tube and removably mounted in the support, a flexible tube secured to the lower end of the said tube, and a float carried by the outlet end of the flexible tube and adapted to recurve such tube when liquid is supplied in the receptacle to a predetermined height.

7. In combination in apparatus for maintaining a constant level, a receptacle, a support mounted above the receptacle, a cork removably mounted in the support, a glass tube slidably mounted in the cork, a rubber tube secured to the lower end of the said tube, and a float detachably secured to the outlet end of the rubber tube and adapted to recurve such tube when liquid is supplied in the receptacle to a predetermined height.

In testimony whereof I have hereunto signed my name in the presence of the two subscribed witnesses.

HORACE A. WOODWARD.

Witnesses:
W. C. WEEKS,
JULIUS OLSON.

Copies of this patent may be obtained for five cents each, by addressing the "Commissioner of Patents, Washington, D. C."